(12) United States Patent
Pelletier et al.

(10) Patent No.: US 10,725,167 B2
(45) Date of Patent: Jul. 28, 2020

(54) FAST SCANNING RADAR SYSTEMS AND METHODS

(71) Applicant: FLIR Systems, Inc., Wilsonville, OR (US)

(72) Inventors: Michel Pelletier, Boisbriand (CA); Patrick Lamontagne, Laval (CA)

(73) Assignee: FLIR SYSTEMS, INC., Wilsonville, OR (US)

( * ) Notice: Subject to any disclaimer, the term of this patent is extended or adjusted under 35 U.S.C. 154(b) by 248 days.

(21) Appl. No.: 15/806,199

(22) Filed: Nov. 7, 2017

(65) Prior Publication Data
US 2018/0143314 A1    May 24, 2018

Related U.S. Application Data

(63) Continuation of application No. PCT/US2016/033664, filed on May 20, 2016.
(Continued)

(51) Int. Cl.
*G01S 13/42*   (2006.01)
*G01S 7/295*   (2006.01)
(Continued)

(52) U.S. Cl.
CPC ............ *G01S 13/426* (2013.01); *G01S 7/295* (2013.01); *G01S 13/86* (2013.01); *H01Q 3/04* (2013.01);
(Continued)

(58) Field of Classification Search
CPC ........ G01S 13/426; G01S 13/86; G01S 15/42; G01S 17/42; G01S 2013/0245; G01S 7/295; H01Q 25/00; H01Q 3/04
(Continued)

(56) References Cited

U.S. PATENT DOCUMENTS 4,851,848 A   7/1989 Wehner
5,036,333 A   7/1991 Chapman et al.
(Continued)

OTHER PUBLICATIONS

De Bruijn, Nico, "AESA radars using Dual-axis Multibeam Scanning," Saudi Symposium for RADAR Technology, Dec. 10, 2014, 16 Pages [online]. Retrieved from the Internet: <http://tangentlink.com/wp-content/uploads/2014/12/4.-AESA-radars-using-Dual-axis-Multibeam-Scanning.pdf>.
Van Den Berg, Simon, "Evolution of naval AESA radars," The 8th European Conference on Antennas and Propagation (EuCAP 2014), European Association on Antennas and Propagation, Apr. 6, 2014, pp. 555-559, The Hague, Netherlands, XP032642899.

*Primary Examiner* — Timothy X Pham
(74) *Attorney, Agent, or Firm* — Haynes and Boone, LLP

(57) ABSTRACT

Techniques are disclosed for systems and methods to provide remote sensing data and/or imagery (e.g., radar and/or other ranging system data, image data, and/or target detection data). A remote sensing system includes a remote sensing assembly including a scanning sensor array, and a coupled logic device. The logic device is configured to receive remote sensor returns from a plurality of remote sensor beams within an illumination zone of the remote sensing assembly, wherein each remote sensor beam is formed using the scanning sensor array and comprises a substantially static orientation relative to an absolute coordinate frame, and generate remote sensor data based, at least in part, on the remote sensor returns and the substantially static orientations of the plurality of remote sensor beams. Subsequent user input and/or the sensor data may be used to adjust operational modes and/or systems of the remote sensing system.

20 Claims, 6 Drawing Sheets

Related U.S. Application Data

(60) Provisional application No. 62/165,802, filed on May 22, 2015.

(51) Int. Cl.
    *H01Q 3/04*     (2006.01)
    *H01Q 25/00*     (2006.01)
    *G01S 13/86*     (2006.01)
    *G01S 17/42*     (2006.01)
    *G01S 15/42*     (2006.01)
    *G01S 13/02*     (2006.01)

(52) U.S. Cl.
    CPC .............. *H01Q 25/00* (2013.01); *G01S 15/42* (2013.01); *G01S 17/42* (2013.01); *G01S 2013/0245* (2013.01)

(58) Field of Classification Search
    USPC .......................................................... 342/75
    See application file for complete search history.

(56) References Cited

U.S. PATENT DOCUMENTS

| | | | |
|---|---|---|---|
| 7,250,902 B2 | 7/2007 | Manoogian et al. | |
| 8,134,492 B1* | 3/2012 | Friesel | G01S 13/426 |
| | | | 342/147 |
| 2008/0278347 A1* | 11/2008 | Ho | G07B 15/063 |
| | | | 340/928 |
| 2009/0109086 A1 | 4/2009 | Krieger et al. | |
| 2010/0164785 A1 | 7/2010 | Gebert et al. | |
| 2010/0253574 A1* | 10/2010 | Mizutani | G01S 13/424 |
| | | | 342/26 R |
| 2012/0056780 A1 | 3/2012 | Antonik et al. | |
| 2012/0146846 A1 | 6/2012 | Antonik et al. | |
| 2012/0196591 A1* | 8/2012 | O'Keeffe | H01Q 1/246 |
| | | | 455/427 |
| 2016/0127919 A1* | 5/2016 | Hui | H04W 16/28 |
| | | | 342/371 |
| 2017/0016988 A1* | 1/2017 | Numata | G01S 7/36 |

\* cited by examiner

FAST SCANNING RADAR SYSTEMS AND METHODS

CROSS-REFERENCE TO RELATED APPLICATIONS

This application is a continuation of International Patent Application No. PCT/US2016/033664 filed May 20, 2016 and entitled "FAST SCANNING RADAR SYSTEMS AND METHODS," which is incorporated herein by reference in its entirety.

International Patent Application No. PCT/US2016/033664 filed May 20, 2016 claims the benefit of and priority to U.S. Provisional Patent Application No. 62/165,802 filed May 22, 2015 and entitled "FAST SCANNING SYSTEMS AND METHODS," which is incorporated herein by reference in its entirety.

TECHNICAL FIELD

One or more embodiments of the invention relate generally to ranging surveillance systems and more particularly, for example, to systems and methods for providing fast scanning radar.

BACKGROUND

Remote sensing systems, such as radar, sonar, lidar, and/or other ranging sensory systems, are often used to assist in general surveillance by producing data and/or imagery of the environment surrounding a stationary or mobile structure. In particular, a common radar system may be used to generate data and/or imagery representing mobile targets, weather features, surface features, and/or other targets associated with a particular area of interest that is being monitored by the system, and that data and/or imagery may be used to provide navigational alerts, determine various characteristics of the targets, and/or may be displayed to a user.

In general, targeting systems are configured to lock onto a target in a relatively small spatial area and to follow that target's trajectory as it moves relative to the system. By contrast, surveillance systems are typically configured to surveil as large an area as possible and are ideally able to determine characteristics of many different targets and/or types of targets with different trajectories, substantially simultaneously. For example, radar system surveillance installations are often required to scan across an entire azimuthal plane by rotating a radar antenna 360 degrees about a vertical axis, and such systems can detect a number of different targets all throughout the azimuthal plane. Conventionally, such systems must be rotated or scanned relatively slowly in order to provide sufficiently long illumination time on targets. Typically, long illumination times are required to detect characteristics of slow moving targets.

Slow scanning speeds are undesirable because they limit how often a position or other characteristic of a detected target is updated. Additional sensors/antennas or entire installations may be distributed across an area of interest to increase the overall effective update rate, but such systems are typically relatively expensive and can be difficult to manufacture, operate, and maintain. Thus, there is a need for an improved methodology to provide relatively fast updating remote sensing systems while maintaining or improving detection performance (e.g., time-on-target, minimal detectable velocity, and/or other performance measures), general accuracy, operational simplicity, and overall cost.

SUMMARY

Techniques are disclosed for systems and methods to provide remote sensing data and/or imagery (e.g., radar and/or other ranging system data, image data, and/or target detection data) for surveillance purposes. A remote sensing system may include radar assemblies, sonar assemblies, other remote sensing assemblies, and logic devices configured to communicate with the various assemblies. Each remote sensing assembly may be adapted to be mounted to a stationary structure, a mobile structure, and/or placed in a body of water, and each remote sensing system may include an orientation and/or position sensor (OPS). The logic devices may be configured to receive sensor returns and generate data and/or imagery based on the sensor returns and corresponding orientations and/or positions measured by the OPS. Subsequent user input and/or the generated data and/or imagery may be used to determine and/or display characteristics of detected targets to a user.

In various embodiments, remote sensing systems may include one or more orientation sensors, position sensors, gyroscopes, accelerometers, and/or additional sensors, actuators, controllers, user interfaces, mapping systems, and/or other modules mounted to a stationary structure/installation or a vehicle. Each component of the system may be implemented with a logic device adapted to form one or more wired and/or wireless communication links for transmitting and/or receiving sensor signals, control signals, or other signals and/or data between the various components.

In one embodiment, a system may include a remote sensing assembly comprising a scanning sensor array and a logic device configured to communicate with the remote sensing assembly. The logic device may be configured to receive remote sensor returns from a plurality of remote sensor beams within an illumination zone of the remote sensing assembly, wherein each remote sensor beam is formed using the scanning sensor array and comprises a substantially static orientation relative to an absolute coordinate frame; and generate remote sensor data based, at least in part, on the remote sensor returns and the substantially static orientations of the plurality of remote sensor beams.

In another embodiment, a method may include receiving remote sensor returns from a plurality of remote sensor beams within an illumination zone of a remote sensing assembly, wherein each remote sensor beam is formed using a scanning sensor array and comprises a substantially static orientation relative to an absolute coordinate frame; and generating remote sensor data based, at least in part, on the remote sensor returns and the substantially static orientations of the plurality of remote sensor beams. In various embodiments, a dwell window width of the remote sensing assembly (e.g., the angular width travelled by the scanning sensor array during one dwell period) may be equal to or greater than a width of two of the remote sensor beams.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Figure 1:
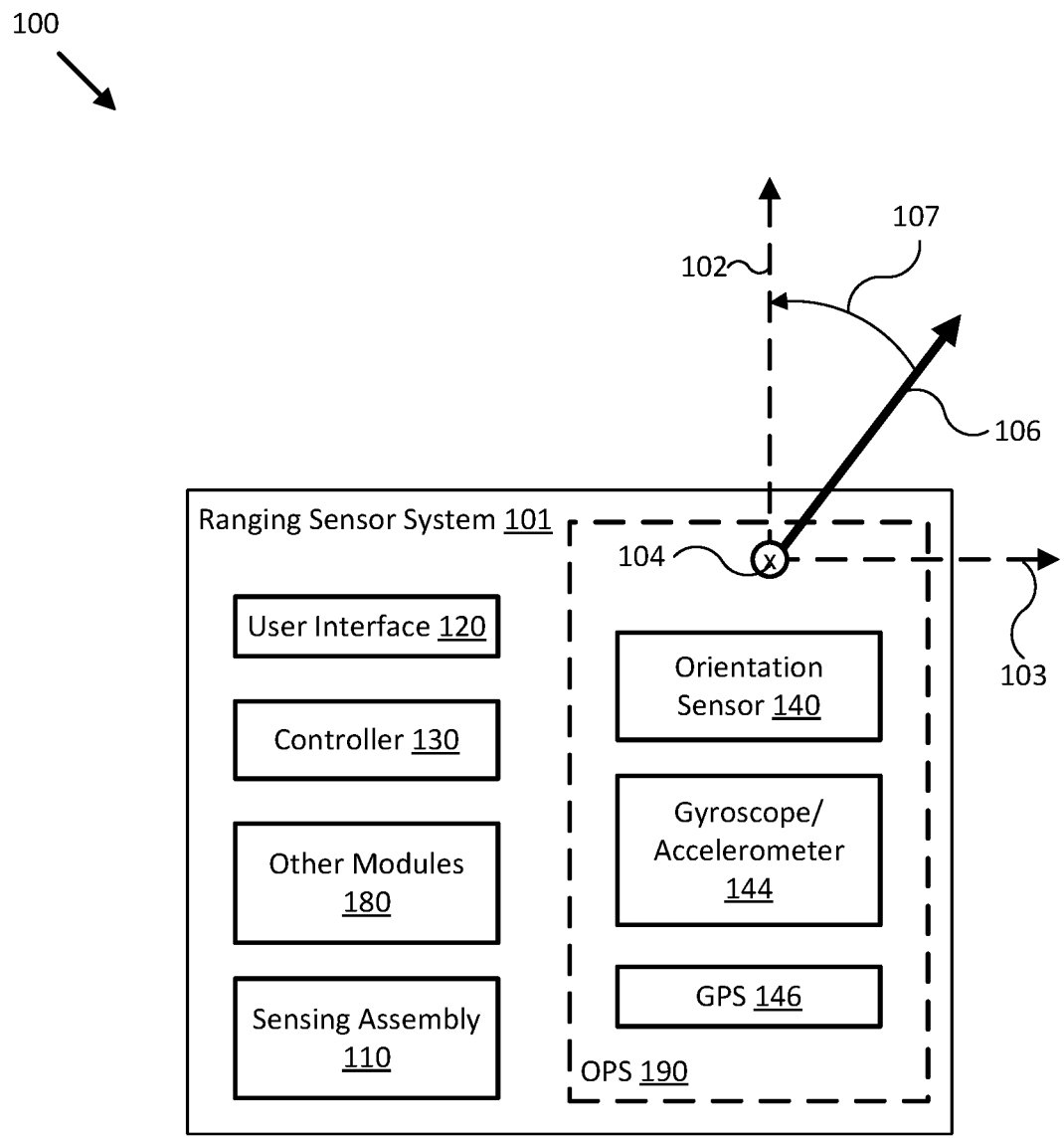
FIG. 1 illustrates a block diagram of a remote sensing system in accordance with an embodiment of the disclosure.

In accordance with various embodiments of the present disclosure, remote sensing data and/or imagery may be provided by a remote sensing system (e.g., a radar, lidar, sonar, and/or other ranging sensor system) including one or more remote sensing assemblies, orientation sensors, gyroscopes, accelerometers, position sensors, and/or speed sensors providing measurements of an orientation, a position, an acceleration, and/or a speed of the remote sensing assemblies and/or a coupled mobile or stationary structure. For example, the various sensors may be mounted to or within a mobile structure (e.g., a watercraft, aircraft, motor vehicle, and/or other mobile structure), or may be integrated with the remote sensing assemblies, as described herein. Embodiments of the present disclosure produce remote sensing data and/or imagery (e.g., target detection and/or image data) that provides increased time-on-target, is faster updating, less expensive, and/or more accurate than conventional systems and/or methods.

In surveillance systems, and in particular radar surveillance systems, certain aspects of system performance (e.g., detection performance, clutter-rejection performance, minimal detectable velocity, and/or other performance criteria) are typically directly proportional to the system's time-on-target, which may be defined as the time a target is illuminated by the system during a single dwell period. Therefore, it is generally desirable to have a long time-on-target.

To explain, a radar system is typically configured to transmit or emit one or several electromagnetic pulses/waveforms, then to measure and/or integrate returns (e.g., reflections of pulses/waveforms from a target) corresponding to the pulses/waveforms. The time period between emission of a first set of pulses/waveforms and second subsequent set of pulses/waveforms may be referred to as the dwell time or dwell period for that sensor and/or system. In some embodiments, the dwell period can include time to acquire sensor data for a given target, coherently or incoherently process that data, and/or transmit that data for further processing and/or storage. As used herein, the pattern and number of the pulses/waveforms, the length of various associated time periods and any added delays, other characteristics of the pulses/waveforms and/or other signals used to acquire target data, and/or other characteristics of a complete emission, reception, and/or signal processing procedure during a dwell period may be referred to as the "dwell" for the sensor and/or system.

Different dwells in a series of dwells may be differentiated by different pulse patterns (e.g., pulse widths, number of pulses/waveforms, modulations, and/or other pulse pattern characteristics), but the dwell periods for the series of dwells are typically selected to be constant for a particular operating mode of the radar system (e.g., operating modes corresponding to a selected range for the system and/or an emphasis of a type of detectable target characteristic through selection of a particular pulse pattern and/or dwell period, for example).

As noted herein, time-on-target may be defined as the time a target is illuminated by the system during a single dwell period. A target is considered to be illuminated by the system while emissions can reach the target and returns corresponding to those emissions can be acquired. Therefore, the maximum possible time-on-target for any single dwell is the dwell period for that dwell. However, with conventional scanning surveillance systems, where the transmitters and receivers form beams that are moved or scanned across an area of interest in order to surveil a relatively large spatial area, the time-on-target also depends on how quickly the beams are moved/scanned across the target. Therefore, for conventional scanning surveillance systems, the time-on-target during a single dwell may be increased primarily by decreasing the scanning speed of the system (e.g., to keep the target within the moving beam), up to a maximum time-on-target defined by the corresponding dwell period. Longer times-on-target can be beneficial for system performance (e.g., longer times-on-target provides lower (or better) minimum detectable velocities of targets).

If the system performance metrics that are directly proportional to time-on-target were the only important criteria for system performance, then the ideal system would be scanned slowly enough to ensure the time-on-target was equal to the dwell period for each dwell. However, it is also desirable in perimeter surveillance applications to cover large areas (e.g., typically up to 360° in azimuth) as fast as possible to provide a relatively high update rate and, thereby, adequate situational awareness within the area of interest. Therefore, in conventional scanned surveillance systems, time-on-target and update rate are contradictory performance measures.

Conventional systems attempt to address this problem by employing multiple antennas or beams, which increases overall cost to manufacture and maintain the system. Conventional digital beamforming-on-receive radar systems attempt to address the problem, at least partially, by illuminating a relatively wide area (e.g., 90 degrees to 120 degrees) with a single phased-array receive antenna. Unfortunately, these systems cannot reach full 360 degree coverage without also using multiple antennas (e.g., four or more, which can quadruple the cost), using a 360 degree conformal antenna (e.g., which increases system cost, size, and complexity), or scanning the system slowly enough to make sure targets remain within the same beam during one dwell period, as described herein. This can require extremely slow scanning (e.g., more than 10 seconds between 360 degree updates) when the individual angular widths of the beams are small to provide a sufficiently high angular detection resolution for the system in order to resolve and/or locate targets relatively accurately. Embodiments of the present disclosure solve these problems by providing relatively fast updates over full 360 degree scans while maintaining relatively long times-on-target, all using a single antenna array/remote sensing assembly, as described herein.

FIG. 1 illustrates a block diagram of a surveillance system 100 in accordance with an embodiment of the disclosure. In various embodiments, system 100 may be adapted to measure an orientation, a position, an acceleration, and/or a speed of sensing assembly 110, user interface 120, and/or ranging sensor system 101 using any of the various sensors of orientation and/or position sensor (OPS) 190 and/or system 101. System 100 may then use these measurements to generate accurate remote sensor data from sensor returns provided by sensing assembly 110 according to a desired operation of system 100 and/or ranging sensor system 101. In some embodiments, system 100 may display resulting remote sensor data and/or imagery to a user through user interface 120, and/or use the remote sensor data, orientation and/or sensor data, and/or imagery to control operation of system 100 and/or a coupled surveillance installation, such as provide navigational and/or targeting control for a coupled mobile structure, for example.

In the embodiment shown in FIG. 1, system 100 may be implemented to provide remote sensor data and/or imagery for a particular type of ranging sensor system 101, such as a ranging sensor system configured to be installed on a drone, a watercraft, an aircraft, a robot, a vehicle, and/or other types of mobile structures, including any platform designed to move through or under the water, through the air, and/or on a terrestrial surface. In one embodiment, system 100 may include one or more of sensing assembly 110, user interface 120, controller 130, an OPS 190 (e.g., including an orientation sensor 140, a gyroscope/accelerometer 144, and/or a global positioning satellite system (GPS) 146), and one or more other sensors and/or actuators, such as other modules 180. In some embodiments, one or more of the elements of system 100 may be implemented in a combined housing or structure that can be coupled to a surveillance installation, for example, and/or held or carried by a user of ranging sensor system 101.

Directions 102, 103, and 104 describe one possible coordinate frame of ranging sensor system 101 (e.g., for headings or orientations measured by orientation sensor 140 and/or angular velocities and accelerations measured by gyroscope/accelerometer 144). As shown in FIG. 1, direction 102 illustrates a direction that may be substantially parallel to and/or aligned with a longitudinal axis of ranging sensor system 101, direction 103 illustrates a direction that may be substantially parallel to and/or aligned with a lateral axis of ranging sensor system 101, and direction 104 illustrates a direction that may be substantially parallel to and/or aligned with a vertical axis of ranging sensor system 101, as described herein. For example, a roll component of motion of ranging sensor system 101 may correspond to rotations around direction 102, a pitch component may correspond to rotations around direction 103, and a yaw component may correspond to rotations around direction 104. In various embodiments, sensing assembly 110 may be scanned across an area of interest using any combination of roll, pitch, and/or yaw.

Angle 107 may correspond to the angle between a projection of a reference direction 106 (e.g., the local component of the Earth's magnetic field) onto a horizontal plane (e.g., referenced to a gravitationally defined "down" vector local to ranging sensor system 101) and a projection of direction 102 onto the same horizontal plane. In some embodiments, the projection of reference direction 106 onto a horizontal plane (e.g., referenced to a gravitationally defined "down" vector) may be referred to as Magnetic North. In various embodiments, Magnetic North, True North, a "down" vector, and/or various other directions, positions, and/or fixed or relative reference frames may define an absolute coordinate frame (e.g., an absolute reference frame), for example, where directional measurements referenced to an absolute coordinate frame may be referred to as absolute directional measurements (e.g., an "absolute" orientation). In some embodiments, directional measurements may initially be referenced to a coordinate frame of a particular sensor (e.g., an antenna or other module of sensing assembly 110, OPS 190, orientation sensor 140, and/or user interface 120, for example) and be transformed (e.g., using parameters for one or more coordinate frame transformations) to be referenced to an absolute coordinate frame and/or a coordinate frame of ranging sensor system 101. In various embodiments, an absolute coordinate frame may be defined and/or correspond to a coordinate frame with one or more undefined axes, such as a horizontal plane local to ranging sensor system 101 and referenced to a local gravitational vector but with an unreferenced and/or undefined yaw reference (e.g., no reference to Magnetic North).

Sensing assembly 110 may be implemented as one or more electrically and/or mechanically coupled controllers, transmitters, receivers, transceivers, scanning sensor arrays, signal processing logic devices, various electrical components, transducer and/or antenna elements of various shapes and sizes, multichannel transducers/transducer modules, transducer assemblies, multichannel antennas/antenna modules, radar assemblies, optical assemblies, assembly brackets, transom brackets, and/or various actuators (e.g., motors, and/or other actuators) adapted to adjust orientations of any of the components of sensing assembly 110, as described herein. It should be understood that "scanning sensor array," as used herein, may refer to sensor arrays that can be continuously rotated about an axis (e.g., as typical with radar systems) and/or sensor arrays that can be aimed in a particular direction or series of directions so as to scan a selected portion of the environment preferentially, for example.

For example, in some embodiments, sensing assembly 110 may be implemented and/or operated according to a sonar system arrangement (e.g., remote sensing system arrangement) that can be used to detect objects within a water column and/or a floor of a body of water. In such embodiments, sensing assembly 110 may be configured to emit one, multiple, or a series of acoustic beams (e.g., remote sensor beams), receive corresponding acoustic returns (e.g., remote sensor returns), and convert the acoustic returns into sonar data and/or imagery (e.g., remote sensor data and/or imagery), such as bathymetric data, water depth, water temperature, water column/volume debris, bottom profile, and/or other types of sonar data. Sensing assembly 110 may be configured to provide such data and/or imagery to user interface 120 for display to a user, for example, or to controller 130 for additional processing, as described herein.

In other embodiments, sensing assembly 110 may be implemented according to various radar system arrangements (e.g., remote sensing system arrangements) that can be used to detect features of and objects on or above a terrestrial surface or a surface of a body of water. In such embodiments, sensing assembly 110 may be configured to emit and/or form one, multiple, or a series of radar beams (e.g., remote sensor beams), receive corresponding radar returns (e.g., remote sensor returns), and convert the radar returns into radar data and/or imagery (e.g., remote sensor data and/or imagery), such as one or more intensity plots and/or aggregation of intensity plots indicating a relative position, orientation, and/or other characteristics of structures, weather phenomena, waves, mobile structures, surface boundaries, and/or other objects reflecting the radar beams back at sensing assembly 110. Sensing assembly 110 may be configured to provide such data and/or imagery to user interface 120 for display to a user, for example, or to controller 130 for additional processing, as described herein. Moreover, such data may be used to generate one or more charts corresponding to MS data, ARPA data, MARPA data, and/or one or more other target tracking and/or identification protocols.

In some embodiments, sensing assembly 110 may be implemented using a compact design, where multiple remote sensors and/or associated processing devices are located within a single sensing assembly housing that is configured to interface with the rest of system 100 through a single cable providing both power and communications to and from sensing assembly 110. In various embodiments, sensing assembly 110 may include orientation and/or position sensors (e.g., OPS 190) configured to help provide two or three dimensional waypoints, increase remote sensor data and/or imagery quality, and/or provide highly accurate remote sensor data and/or imagery, as described herein. Sensing assembly 110 may consolidate electronics and transducers into a single weatherproof package to reduce size and costs, for example, and may be implemented with a single connection to other devices of system 100 (e.g., via an Ethernet cable with power over Ethernet, an integral power cable, and/or other communication and/or power transmission conduits integrated into a single interface cable).

In various embodiments, sensing assembly 110 may be implemented with its own dedicated OPS 190, which may include various orientation and/or position sensors (e.g., similar to orientation sensor 140, gyroscope/accelerometer 144, and/or GPS 146) that may be incorporated within the sensing assembly housing to provide three dimensional orientations, and/or positions of the sensing assembly and/or sensors/antenna(s) for use when processing or post processing remote sensor data for display. The sensor information can be used to correct for movement of sensing assembly 110 between beam emissions to provide improved alignment of corresponding returns/samples, for example, and/or to generate imagery based on the measured orientations and/or positions of the sensing assembly. In other embodiments, an external orientation and/or position sensor can be used alone or in combination with an integrated sensor or sensors.

In embodiments where sensing assembly 110 is implemented with a position sensor, sensing assembly 110 may be configured to provide a variety of remote sensor data and/or imagery enhancements. For example, sensing assembly 110 may be configured to provide accurate positioning of remote sensor data and/or user-defined waypoints. Similarly, sensing assembly 110 may be configured to provide accurate two and/or three dimensional aggregation and/or display of a series of remote sensor data; without either orientation data or position data to help determine a track or heading, a remote sensing system mounted to a mobile structure typically assumes a straight track or no motion at all, which can cause image artifacts and/or other inaccuracies in corresponding remote sensor data and/or imagery if motion of sensing assembly 110 isn't properly accounted for. Additionally, when implemented with a position sensor, sensing assembly 110 may be configured to generate accurate and detailed intensity plots of objects on a surface of a body of water without access to a magnetometer.

In embodiments where sensing assembly 110 is implemented with an orientation and/or position sensor, sensing assembly 110 may be configured to store such location/position information along with other sensor information (sonar/radar/lidar returns, temperature measurements, text descriptions, altitude, mobile structure speed, and/or other sensor and/or control information) available to system 100. In some embodiments, controller 130 may be configured to generate a look up table so that a user can select desired configurations of sensing assembly 110 for a particular location or to coordinate with some other sensor information. Alternatively, an automated adjustment algorithm can be used to select optimum configurations based on the sensor information.

For example, in one embodiment, ranging sensor system 101 may be located in an area identified on an chart using position data, a user may have selected a user setting for a configuration of sensing assembly 110, and controller 130 may be configured to control an actuator and/or otherwise implement the configuration for sensing assembly 110 (e.g., to set a particular orientation or scanning rate). In still another embodiment, controller 130 may be configured to receive orientation measurements for ranging sensor system 101. In such embodiment, controller 130 may be configured to control the actuators associated with the radar assembly to maintain its orientation and/or scanning rate relative to, for example, the mobile structure and/or the local surface, and thus improve the displayed remote sensor images (e.g., by ensuring consistently oriented remote sensor beams and/or proper registration of a series of remote sensor returns).

Although FIG. 1 shows various sensors and/or other components of system 100 separate from sensing assembly 110, in other embodiments, any one or combination of sensors and components of system 100 may be integrated with a sensor array, an actuator, a transducer module, and/or other components of sensing assembly 110. For example, OPS 190 may be integrated with an antenna platform of sensing assembly 110 and be configured to provide measurements of an absolute and/or relative orientation (e.g., a roll, pitch, and/or yaw) of the antenna to controller 130 and/or user interface 120, both of which may also be integrated with sensing assembly 110.

User interface 120 may be implemented as a display, a touch screen, a keyboard, a mouse, a joystick, a knob, a steering wheel, and/or any other device capable of accepting user input and/or providing feedback to a user. In various embodiments, user interface 120 may be adapted to provide user input (e.g., as a type of signal and/or sensor information) to other devices of system 100, such as controller 130. User interface 120 may also be implemented with one or more logic devices that may be adapted to execute instructions, such as software instructions, implementing any of the various processes and/or methods described herein. For example, user interface 120 may be adapted to form communication links, transmit and/or receive communications (e.g., sensor signals, control signals, sensor information, user input, and/or other information), determine various coordinate frames and/or orientations, determine parameters for one or more coordinate frame transformations, and/or perform coordinate frame transformations, for example, or to perform various other processes and/or methods.

In various embodiments, user interface 120 may be adapted to accept user input, for example, to form a communication link, to select a particular wireless networking protocol and/or parameters for a particular wireless networking protocol and/or wireless link (e.g., a password, an encryption key, a MAC address, a device identification number, a device operation profile, parameters for operation of a device, and/or other parameters), to select a method of processing sensor signals to determine sensor information, to adjust a position and/or orientation of an articulated sensor, and/or to otherwise facilitate operation of system 100 and devices within system 100. Once user interface 120 accepts a user input, the user input may be transmitted to other devices of system 100 over one or more communication links.

In one embodiment, user interface 120 may be adapted to receive a sensor or control signal (e.g., from an orientation sensor and/or a steering sensor/actuator) over communication links formed by one or more associated logic devices, for example, and display sensor and/or other information corresponding to the received sensor or control signal to a user. In related embodiments, user interface 120 may be adapted to process sensor and/or control signals to determine sensor and/or other information. For example, a sensor signal may include an orientation, an angular velocity, an acceleration, a speed, and/or a position of ranging sensor system 101. In such embodiment, user interface 120 may be adapted to process the sensor signals to determine sensor information indicating an estimated and/or absolute roll, pitch, and/or yaw (attitude and/or rate), and/or a position or series of positions of sensing assembly 110 and/or ranging sensor system 101, for example, and display the sensor information as feedback to a user.

In one embodiment, user interface 120 may be adapted to display a time series of various sensor information and/or other parameters as part of or overlaid on a graph or map, which may be referenced to a position and/or orientation of ranging sensor system 101. For example, user interface 120 may be adapted to display a time series of positions, headings, and/or orientations of ranging sensor system 101 and/or other elements of system 100 (e.g., a transducer assembly and/or module of sensing assembly 110, or an antenna or radar assembly of sensing assembly 110) overlaid on a geographical map, which may include one or more graphs indicating a corresponding time series of actuator control signals, sensor information, and/or other sensor and/or control signals, including sonar and/or radar image data.

In some embodiments, user interface 120 may be adapted to accept user input including a user-defined target attitude/absolute angular frequency for an actuated device (e.g., sensing assembly 110, sensing assembly 110) coupled to ranging sensor system 101, for example, and to generate control signals for adjusting an orientation or rotation of the actuated device according to the target attitude/angular frequency. More generally, user interface 120 may be adapted to display sensor information to a user, for example, and/or to transmit sensor information and/or user input to other user interfaces, sensors, or controllers of system 100, for instance, for display and/or further processing. In one embodiment, user interface 120 may be integrated with one or more sensors (e.g., imaging modules, position and/or orientation sensors, other sensors) and/or be portable (e.g., such as a portable touch display or smart phone, for example, or a wearable user interface) to facilitate user interaction with various systems of ranging sensor system 101.

Controller 130 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of sensing assembly 110, ranging sensor system 101, and/or surveillance system 100, for example. Such software instructions may also implement methods for processing sensor signals, determining sensor information, providing user feedback (e.g., through user interface 120), querying devices for operational parameters, selecting operational parameters for devices, or performing any of the various operations described herein (e.g., operations performed by logic devices of various devices of system 100).

In addition, a machine readable medium may be provided for storing non-transitory instructions for loading into and execution by controller 130. In these and other embodiments, controller 130 may be implemented with other components where appropriate, such as volatile memory, non-volatile memory, one or more interfaces, and/or various analog and/or digital components for interfacing with devices of system 100. For example, controller 130 may be adapted to store sensor signals, sensor information, parameters for coordinate frame transformations, calibration parameters, sets of calibration points, and/or other operational parameters, over time, for example, and provide such stored data to a user using user interface 120. In some embodiments, controller 130 may be integrated with one or more user interfaces (e.g., user interface 120), and, may share a communication module or modules. As noted herein, controller 130 may be adapted to execute one or more control loops for actuated device control and/or performing other various operations of ranging sensor system 101 and/or system 100. In some embodiments, a control loop may include processing sensor signals and/or sensor information in order to control one or more operations of sensing assembly 110, ranging sensor system 101, and/or system 100.

OPS 190 may be implemented as an integrated selection of orientation and/or position sensors (e.g., orientation sensor 140, accelerometer/gyroscope 144, GPS 146) that is configured to provide orientation and/or position data in relation to one or more elements of system 100. For example, embodiments of OPS 190 may be integrated with ranging sensor system 101 and/or sensing assembly 110 and be configured to provide orientation and/or position data corresponding to a center of mass of ranging sensor system 101, a sonar transducer of sensing assembly 110, and/or a radar antenna of sensing assembly 110. Such measurements may be referenced to an absolute coordinate frame, for example, or may be referenced to a coordinate frame of OPS 190 and/or any one of the individual sensors integrated with OPS 190. More generally, OPS 190 provides a single, relatively compact integrated device that can be replicated throughout various elements of system 100, which in some embodiments may include a single/simplified interface for data and/or power. In various embodiments, the coordinate frames for one or more of the orientation and/or position sensors integrated into OPS 190 may be referenced to each other (e.g., to a single coordinate frame for OPS 190), such as at time of manufacture, to reduce or eliminate a need to determine coordinate frame transformations to combine data from multiple sensors of OPS 190 during operation of system 100.

Orientation sensor 140 may be implemented as one or more of a compass, float, accelerometer, magnetometer, and/or other digital or analog device capable of measuring an orientation of ranging sensor system 101 (e.g., magnitude and direction of roll, pitch, and/or yaw, relative to one or more reference orientations such as gravity and/or Magnetic North) and providing such measurements as sensor signals that may be communicated to various devices of system 100. In some embodiments, orientation sensor 140 may be adapted to provide roll, pitch, and/or yaw rates for ranging sensor system 101 (e.g., using a time series of orientation measurements). Orientation sensor 140 may be positioned and/or adapted to make orientation measurements in relation to a particular coordinate frame of ranging sensor system 101, for example.

Gyroscope/accelerometer 144 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of ranging sensor system 101 and providing such measurements as sensor signals that may be communicated to other devices of system 100 (e.g., user interface 120, controller 130). Gyroscope/accelerometer 144 may be positioned and/or adapted to make such measurements in relation to a particular coordinate frame of ranging sensor system 101, for example. In various embodiments, gyroscope/accelerometer 144 may be implemented in a common housing and/or module to ensure a common reference frame or a known transformation between reference frames.

GPS 146 may be implemented as a global positioning satellite receiver and/or other device capable of determining absolute and/or relative position of ranging sensor system 101 (e.g., or an element of ranging sensor system 101, such as sensing assembly 110 sensing assembly 110, and/or user interface 120) based on wireless signals received from space-born and/or terrestrial sources, for example, and capable of providing such measurements as sensor signals that may be communicated to various devices of system 100. More generally, GPS 146 may be implemented according to any one or combination of a number of different global navigation satellite systems (GNSSs) (e.g., GPS, GLONASS, Galileo, COMPASS, IRNSS, and/or other GNSSs). In some embodiments, GPS 146 may be used to determine a velocity, speed, course over ground (COG), speed over ground (SOG), track, and/or yaw rate of ranging sensor system 101 (e.g., using a time series of position measurements), such as an absolute velocity and/or a yaw component of an angular velocity of ranging sensor system 101. In various embodiments, one or more logic devices of system 100 may be adapted to determine a calculated speed of ranging sensor system 101 and/or a computed yaw component of the angular velocity from such sensor information.

Other modules 180 may include other and/or additional sensors, actuators, communications modules/nodes, and/or user interface devices used to provide additional environmental information of ranging sensor system 101, for example. In some embodiments, other modules 180 may include a humidity sensor, a wind and/or water temperature sensor, a barometer, a visible spectrum camera, an infrared camera, and/or other environmental sensors providing measurements and/or other sensor signals that can be displayed to a user and/or used by other devices of system 100 (e.g., controller 130) to provide operational control of ranging sensor system 101 and/or system 100 that compensates for environmental conditions, such as wind speed and/or direction, swell speed, amplitude, and/or direction, and/or an object in a path of ranging sensor system 101, for example.

In other embodiments, other modules 180 may include one or more actuated devices (e.g., spotlights, infrared illuminators, cameras, radars, sonars, and/or other actuated devices) coupled to ranging sensor system 101, where each actuated device includes one or more actuators adapted to adjust an orientation of the device, relative to ranging sensor system 101, in response to one or more control signals (e.g., provided by controller 130). Other modules 180 may include a sensing element angle sensor, for example, which may be physically coupled to a radar assembly housing of sensing assembly 110 and be configured to measure an angle between an orientation of an antenna/sensing element and a longitudinal axis of the housing and/or ranging sensor system 101. In various embodiments, such sensing element angle sensor may be integrated with OPS 190. Other modules 180 may also include a rotating antenna platform and/or corresponding platform actuator for sensing assembly 110.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sonar data and/or imagery, for example, or for transmitting and/or receiving communications, such as sensor signals, sensor information, and/or control signals, between one or more devices of system 100. In one embodiment, such method may include instructions to receive an orientation, acceleration, position, and/or speed of ranging sensor system 101 and/or sensing assembly 110 from various sensors, to determine a sensor array adjustment (e.g., relative to a desired orientation) from the sensor signals, and/or to control an actuator to adjust a sensor array orientation accordingly, for example, as described herein. In a further embodiment, such method may include instructions for forming one or more communication links between various devices of system 100.

In addition, one or more machine readable mediums may be provided for storing non-transitory instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Each of the elements of system 100 may be implemented with one or more amplifiers, modulators, phase adjusters, beamforming components, digital to analog converters (DACs), analog to digital converters (ADCs), various interfaces, antennas, transducers, and/or other analog and/or digital components enabling each of the devices of system 100 to transmit and/or receive signals, for example, in order to facilitate wired and/or wireless communications between one or more devices of system 100. Such components may be integrated with a corresponding element of system 100, for example. In some embodiments, the same or similar components may be used to perform one or more sensor measurements, as described herein.

For example, the same or similar components may be used to create an acoustic pulse (e.g., a transmission control signal and/or a digital shaping control signal), convert the acoustic pulse to an excitation signal (e.g., a shaped or unshaped transmission signal) and transmit it to a sonar transducer element to produce an acoustic beam, receive an acoustic return (e.g., a sound wave received by the sonar transducer element and/or corresponding electrical signals from the sonar transducer element), convert the acoustic return to acoustic return data, and/or store sensor information, configuration data, and/or other data corresponding to operation of a sonar system, as described herein. Similarly, the same or similar components may be used to create a radar pulse (e.g., a transmission control signal and/or a digital shaping control signal), convert the radar pulse to an excitation signal (e.g., a shaped or unshaped transmission signal) and transmit it to a radar antenna to produce a radar beam, receive a radar return (e.g., an electromagnetic wave received by the radar antenna and/or corresponding electrical signals from the radar antenna), convert the radar return to radar return data, and/or store sensor information, configuration data, and/or other data corresponding to operation of a radar system, as described herein.

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques.

In some embodiments, various elements or portions of elements of system 100 may be integrated with each other, for example, or may be integrated onto a single printed circuit board (PCB) to reduce system complexity, manufacturing costs, power requirements, and/or timing errors between the various sensor measurements. For example, gyroscope/accelerometer 144, user interface 120, and controller 130 may be configured to share one or more components, such as a memory, a logic device, a communications module, and/or other components, and such sharing may act to reduce and/or substantially eliminate such timing errors while reducing overall system complexity and/or cost.

Each element of system 100 may include one or more batteries or other electrical power storage devices, for example, and may include one or more solar cells or other electrical power generating devices (e.g., a wind or water-powered turbine, or a generator producing electrical power from motion of one or more elements of system 100). In some embodiments, one or more of the devices may be powered by a power source for ranging sensor system 101, using one or more power leads. Such power leads may also be used to support one or more communication techniques between elements of system 100.

In various embodiments, a logic device of system 100 (e.g., of orientation sensor 140 and/or other elements of system 100) may be adapted to determine parameters (e.g., using signals from various devices of system 100) for transforming a coordinate frame of sensing assembly 110 and/or other sensors of system 100 to/from a coordinate frame of ranging sensor system 101, at-rest and/or in-motion, and/or other coordinate frames, as described herein. One or more logic devices of system 100 may be adapted to use such parameters to transform a coordinate frame of sensing assembly 110 and/or other sensors of system 100 to/from a coordinate frame of orientation sensor 140 and/or ranging sensor system 101, for example. Furthermore, such parameters may be used to determine and/or calculate one or more adjustments to an orientation of sensing assembly 110 and/or sensing assembly 110 that would be necessary to physically align a coordinate frame of sensing assembly 110 with a coordinate frame of orientation sensor 140 and/or ranging sensor system 101, for example, or an absolute coordinate frame. Adjustments determined from such parameters may be used to selectively power adjustment servos/actuators (e.g., of sensing assembly 110 and/or other sensors or elements of system 100), for example, or may be communicated to a user through user interface 120, as described herein.

Figure 2:
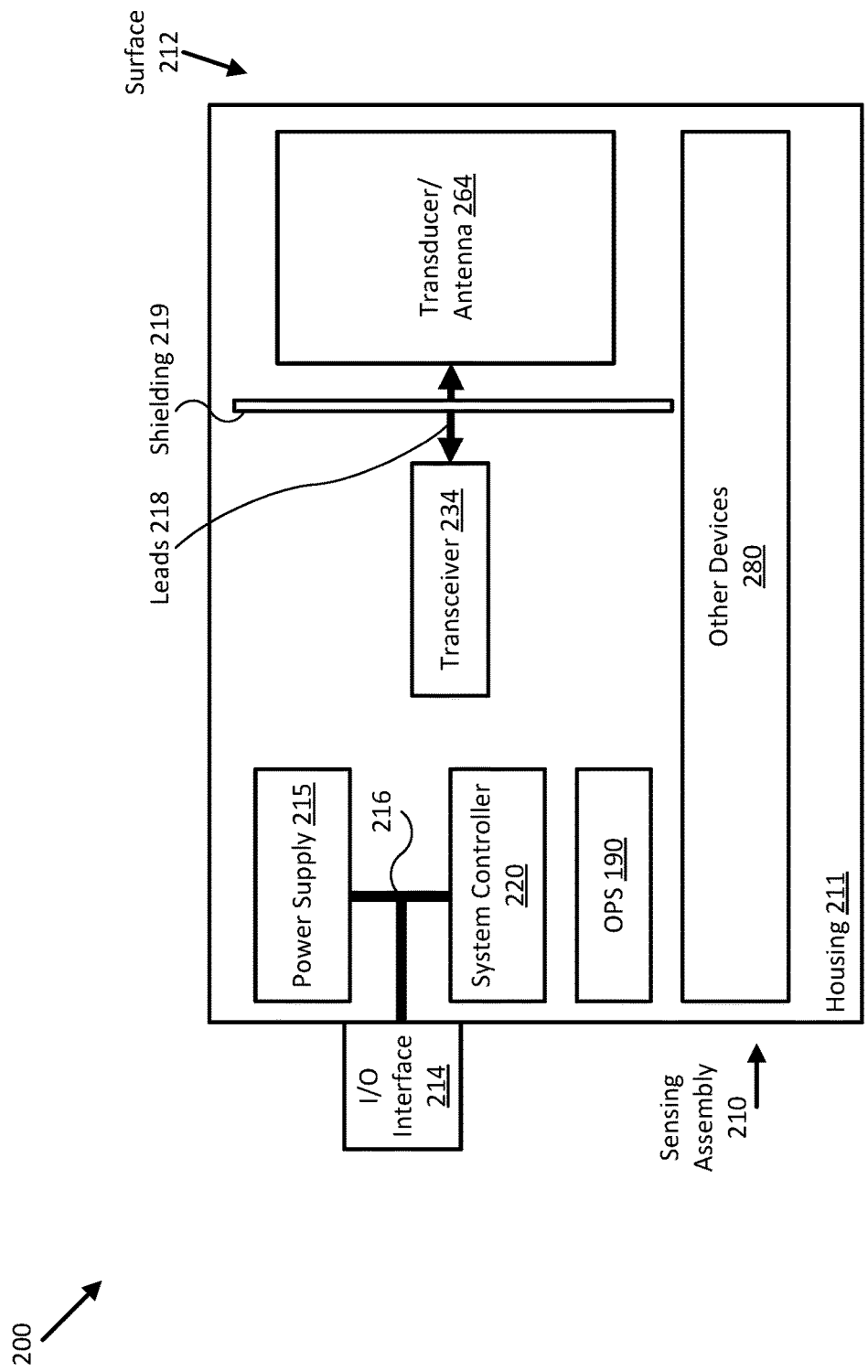
FIG. 2 illustrates a diagram of a remote sensing system in accordance with an embodiment of the disclosure.

FIG. 2 illustrates a diagram of a surveillance system 200 in accordance with an embodiment of the disclosure. In the embodiment shown in FIG. 2, system 200 includes a remote sensing assembly 210 that can be coupled to a user interface (e.g., user interface 120 of FIG. 1) and/or a power source through a single I/O cable 214. As shown, remote sensing assembly 210 may include one or more system controllers 220, sensing elements (e.g., transducer/antenna 264), OPS 190, and/or other devices facilitating operation of system 200 all disposed within a common housing 211. In other embodiments, one or more of the devices shown in FIG. 2 may be integrated with a remote user interface and communicate with remaining devices within remote sensing assembly 210 through one or more data and/or power cables similar to I/O cable 214.

Controller 220 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of remote sensing assembly 210 and/or system 200, for example, similar to controller 130. In typical embodiments, controller 220 may be tasked with overseeing general operation of remote sensing assembly 210, generating remote sensor image data from remote sensor returns and sensor return orientation and/or position data, correlating sensor data with remote sensor data/imagery, communicating operational parameters and/or sensor information with other devices through I/O cable 214, and/or other operations of system 200. Controller 220 may in some embodiments be implemented with relatively high resolution timing circuitry capable of generating digital transmission and/or sampling control signals for operating transmitters, receivers, transceivers, signal conditioners, and/or other devices of remote sensing assembly 210, for example, and other time critical operations of system 200, such as per-sample digital beam-forming and/or interferometry operations applied to remote sensor returns from sensor element 264, as described herein. In some embodiments, controller 220 may be implemented in a distributed manner across a number of individual controllers.

Transceiver 234 may be implemented with one or more digital to analog converters (DACs), signal shaping circuits, filters, phase adjusters, signal conditioning elements, amplifiers, frequency synthesizers and/or generators, timing circuitry, logic devices, and/or other digital and/or analog electronics configured to accept digital control signals from controller 220 and to generate transmission signals to excite a transmission channel/element of remote sensing assembly 210 (e.g., sensor element 264, which in some embodiments can be used to transmit remote sensor beams and receive sensor returns) to produce one or more remote sensor beams. In some embodiments, various transmission operations of transceiver 234 (e.g., amplification, frequency dependent filtering, transmit signal frequency, duration, shape, and/or timing/triggering, and/or other signal attributes), may be controlled (e.g., through use of various control signals) by controller 220, as described herein.

Transceiver 234 may also be implemented with one or more analog to digital converters (ADCs), filters, phase adjusters, frequency synthesizers and/or generators, signal conditioning elements, amplifiers, timing circuitry, logic devices, and/or other digital and/or analog electronics configured to accept analog remote sensor returns from corresponding receive channels/sensing elements of remote sensing assembly 210 (e.g., sensor element 264), convert the analog remote sensor returns into digital remote sensor returns, and provide the digital sensor returns to controller 220. In some embodiments, various receive operations of transceiver 234 (e.g., amplification, frequency dependent filtering, basebanding, sample resolution, duration, and/or timing/triggering, and/or other ADC/signal attributes) may be controlled by controller 220.

For example, controller 220 may be configured to use transceiver 234 to convert a remote sensor return into a digital remote sensor return comprising one or more digital baseband transmissions that are then provided to controller 220. In some embodiments, transceiver 234 may be configured to low-pass or otherwise filter, amplify, decimate, and/or otherwise process the analog and/or digital remote sensor returns (e.g., using analog and/or digital signal processing) prior to providing the digital remote sensor returns to controller 220. In other embodiments, transceiver 234 may be configured to provide substantially unprocessed (e.g., raw) analog and/or digital remote sensor returns to controller 220 for further signal processing (e.g., beamforming on receive), as described herein. In further embodiments, transceiver 234 may be implemented as one or more separate transmitters and receivers.

In the embodiment shown in FIG. 2, sensor element 264 is implemented as a single transmission/receive channel that may be configured to transmit and/or form remote sensor beams and receive remote sensor returns through emission surface 212 of housing 211. In some embodiments, remote sensing assembly 210 may be implemented with multiple transmission and/or receive channels (e.g., a multichannel sonar transducer, or a multichannel/synthetic aperture radar antenna, also referred to as a sensor array, or a bistatic radar with separate transmit and receive antennas, for example). In general, remote sensing assembly 210 may be implemented with one, two, or many separate elements configured to produce one or more remote sensor beams, and one, two, or many separate sensing elements configured to receive remote sensor returns corresponding to the remote sensor beams. The effective volumetric shapes of the remote sensor beams may be determined, at least in part, by the shapes and arrangements of their corresponding sensor elements. In multichannel embodiments, the various channels may be arranged to facilitate multichannel processing, such as beamforming, interferometry, inter-beam interpolation, and/or other types of multichannel processing used to produce remote sensor data and/or imagery. In multichannel embodiments where the channels are scanned across an area of interest, sensor element 264 may correspond to a scanning sensor array.

In FIG. 2, each of sensor element 264 is coupled to its electronics over leads 218 and through shielding 219. In various embodiments, leads 218 and/or shielding 219 may be implemented as one or more shielded transmission lines configured to convey analog and/or digital signals between the various elements while shielding transceiver 234 and sensor element 264 from electromagnetic interference from each other, other elements of remote sensing assembly 210 (e.g., OPS 190), and/or external sources. In some embodiments, leads 218 and shielding 219 may be integrated together to form a transmission system. For example, shielding 219 may be configured to provide a ground plane/return for signals conveyed by leads 218.

As shown, remote sensing assembly 210 may be implemented with OPS 190, which may be configured to measure a relative and/or absolute orientation and/or position of remote sensing assembly 210 and/or sensor element 264 and provide such measurements to controller 220. In some embodiments, controller 220 may be configured to combine remote sensor data and/or imagery according to such measurements and/or measurements of an orientation and/or position of a coupled mobile structure to produce combined remote sensor data and/or imagery, such as multiple co-registered remote sensor images, for example, and/or three dimensional remote sensor imagery. In other embodiments, controller 220 may be configured to use orientation and/or position measurements of remote sensing assembly 210 and/or a coupled mobile structure to control one or more actuators (e.g., other devices 280) to adjust a position and/or orientation of remote sensing assembly 210 and/or sensor element 264 and emit remote sensor beams towards a particular position and/or orientation, for example, to scan remote sensing assembly 210 through a particular area of interest, or otherwise control motion of remote sensing assembly 210 and/or sensor element 264.

Other devices 280 may include other and/or additional sensors, sensor arrays, actuators, logic devices, communications modules/nodes, power distribution components, and/or user interface devices used to provide additional environmental information and/or configuration parameters, for example, and/or to adjust a position and/or orientation of remote sensing assembly 210 and/or sensor element 264. In some embodiments, other devices 280 may include a visible spectrum camera, an infrared camera, and/or other environmental sensors providing measurements and/or other sensor signals that can be displayed to a user and/or used by other devices of remote sensing assembly 210 (e.g., controller 220) to provide operational control of remote sensing assembly 210. In some embodiments, other devices 280 may include one or more actuators adapted to adjust an orientation (e.g., roll, pitch, and/or yaw) and/or a position (longitudinal, lateral, and/or vertical) of remote sensing assembly 210 and/or sensor element 264 relative to a coupled structure, in response to one or more control signals (e.g., provided by controller 220). In other embodiments, other devices 280 may include one or more brackets, such as a transom bracket or a mast bracket, adapted to couple housing 211 to a mobile structure.

Other devices 280 may also include a sensing element angle sensor, for example, which may be physically coupled to housing 211 of remote sensing assembly 210 and be configured to measure an angle between an orientation of sensor element 264 and a longitudinal axis of housing 211 and/or ranging sensor system 101. In various embodiments, such sensing element angle sensor may be integrated with OPS 190. Other devices 280 may also include a rotating platform and/or corresponding platform actuator for sensor element 264 and/or remote sensing assembly 210.

As shown in FIG. 2, remote sensing assembly 210 may be implemented in a single housing 211 with a single interface (e.g., I/O cable 214) to simplify installation and use. For example, I/O cable 214 may be implemented as a power-over-Ethernet (POE) cable supporting transmission of both communications and power between remote sensing assembly 210 and elements of a coupled mobile structure. Such communications and/or power may be delivered over leads 216 to power supply 215 and/or controller 220. Power supply 215 may be implemented as one or more power conditioners, line filters, switching power supplies, DC to DC converters, voltage regulators, power storage devices (e.g., batteries), and/or other power supply devices configured to receive power over leads 216 and/or distribute power to the various other elements of remote sensing assembly 210.

Figure 3:
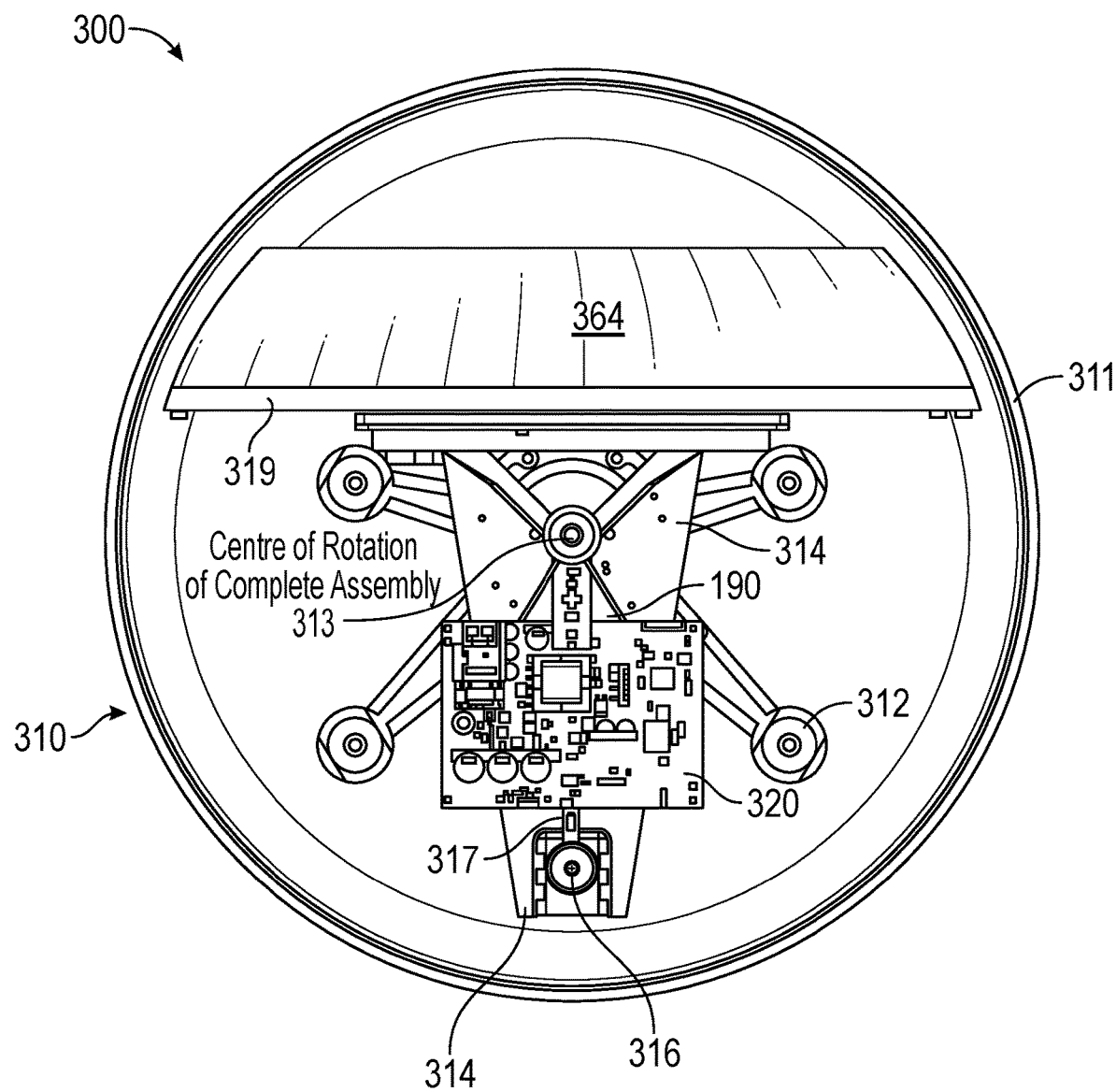
FIG. 3 illustrates a diagram of a remote sensing system in accordance with an embodiment of the disclosure.

FIG. 3 illustrates a diagram of a remote sensing system 300 in accordance with an embodiment of the disclosure. In the embodiment shown in FIG. 3, remote sensing system 300 is implemented as a radar system including a radar assembly 310, housing 311, and radar antenna 364 shielded from system controller 320 and OPS 190 by shielding 319, which correspond to and/or may be implemented similarly to remote sensing assembly 210, housing 211, sensor element 264, controller 220, OPS 190, and shielding 319 of FIG. 2, respectively. Also shown are antenna platform 314 and platform actuator 316 configured to rotate antenna 364, shielding 319, controller 320, and OPS 190 about axis 313, and sensing element (e.g., radar antenna) angle sensor 317 configured to measure an angle between an orientation of antenna 364 and a longitudinal axis of housing 311 (e.g., a vertical line passing perpendicularly through the antenna surface in the orientation shown in FIG. 3).

In some embodiments, radar antenna angle sensor 317 may be configured to monitor a position of platform actuator 316, for example, and derive the measured angle from the monitored position. In other embodiments, radar antenna angle sensor 317 may be configured to detect passage over one or more indexed posts 312 corresponding to a known orientation of antenna 364 relative to a longitudinal axis of housing 311. Controller 320 may be configured to receive a measured angle corresponding to a particular known relative orientation when radar antenna angle sensor 317 passes over the appropriate indexed post 312. In various embodiments, angle sensor 317 may be integrated with and/or be an element of OPS 190.

All sensors of the OPS can be arranged such that they remain behind the radar antenna and/or associated shielding and are substantially protected from electromagnetic radiation interference related to radar beams and/or returns. For example, in embodiments where OPS 190 is attached to a sensing assembly (e.g., sensing assembly 210 or 310) so as to move with the antenna or transducer, additional advantages accrue from the direct measurement of the antenna or transducer orientation/position and the synchronicity of the measurements made by the sensing element and OPS 190. With respect to radar, if OPS 190 is positioned behind the radar antenna and rotates with the antenna, then its exposure to electromagnetic radiation from the antenna can be significantly reduced.

In some embodiments, mounting OPS 190 on moving parts of the radar allows the orientation of the sensing element/antenna to be determined directly rather than through inference from indirect internal and external data. For example, mounting OPS 190 on a scanning antenna platform obviates any need for continuous calculation and/or periodic offset angle calibration. Radar returns may be captured with a direct measurement of the sensor array orientation and position relative the external world as sensed by the OPS. The orientation and/or position data supplied by the OPS can also be used to measure and/or maintain a stable or desired rotation rate (e.g., angular frequency) of the antenna relative to the outside world.

Embodiments of the present disclosure, which may be referred to generally as Fast-Scanning Earth-Referenced Beamforming (FERB) surveillance systems, allows a digital beamforming-on-receive remote sensing assembly (e.g., such as a radar assembly) to scan a relatively large area of interest rapidly (e.g., rotate rapidly across an azimuthal plane) while simultaneously providing a long time-on-target, as described herein. To do this, FERB combines three concepts: Earth referenced beamforming; fast scanning with continuous sequential beam processing; and scan speed matching with dwell period.

Figure 4:
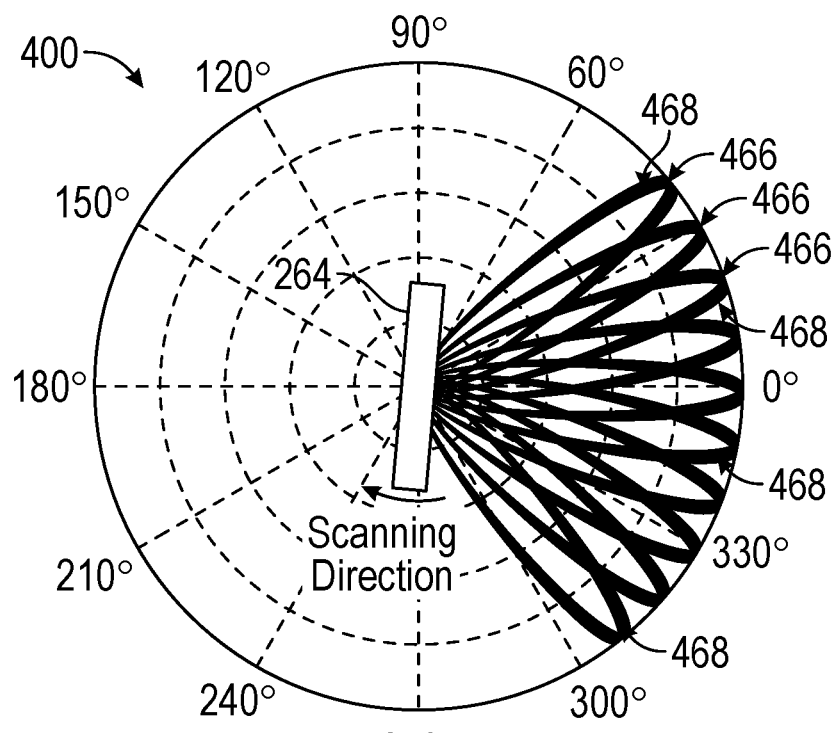
FIG. 4 illustrates a diagram of a remote sensing system operating conventionally.

Traditional digital beamforming-on-receive remote sensing assemblies form a set of receive beams that have a fixed angle relative to the assemblies' sensor element(s). As an example, FIG. 4 illustrates a diagram of a remote sensing system 400 operating conventionally. During a relatively long time-on-target acquisition while the remote sensing assembly is scanning, remote sensor beams 466 (e.g., receive beams) are subject to motion induced spread or blurring 468, which reduces target energy and angular precision as provided by remote sensor returns corresponding to remote sensor beams 466. As noted herein, conventional systems limit the effects of the scanning motion on target detection by limiting the scanning speed to approximately one beam-width per dwell period.

Figure 5:
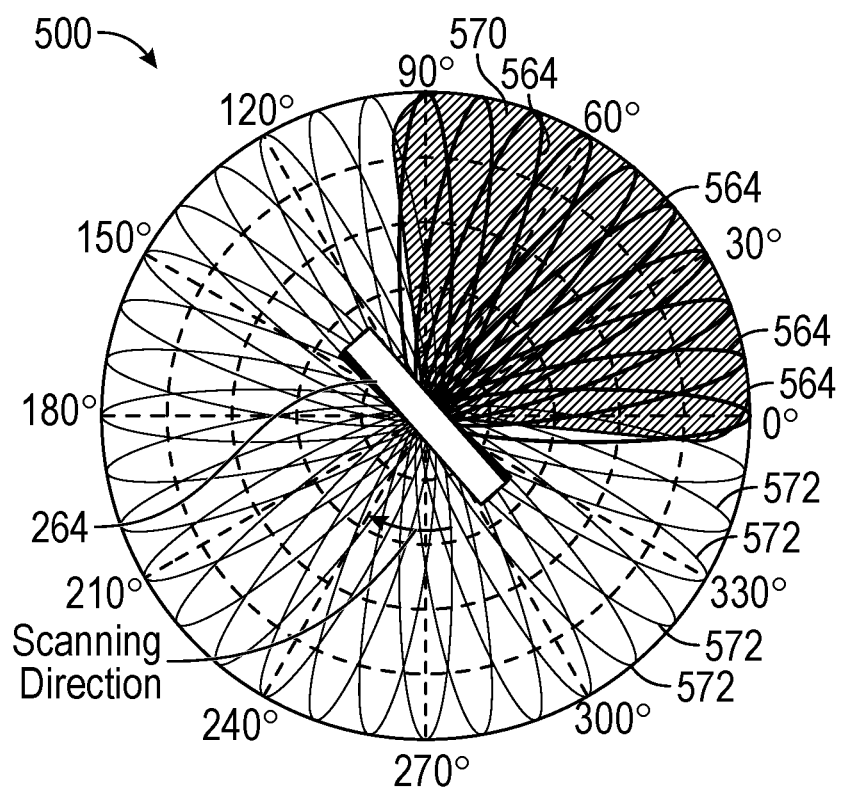
FIG. 5 illustrates a diagram of a remote sensing system operating in accordance with an embodiment of the disclosure.

FIG. 5 illustrates a diagram of a remote sensing system 500 operating in accordance with an embodiment of the disclosure, and, in particular, illustrates Earth referenced beamforming in accordance with an embodiment of the disclosure. Earth referenced beamforming, or more generally, absolute coordinate frame referenced beamforming, includes forming remote sensor beams at substantially fixed positions relative to an absolute coordinate frame, such as any of the absolute coordinate frames related to the Earth (e.g., gravitational direction, magnetic north, longitude and latitude, and/or other absolute coordinate frames) instead of forming beams relative to sensing element 264. In one embodiment, the absolute coordinate frame may correspond to the local azimuthal plane.

For example, during signal acquisition, beamforming of remote sensor beams 564 (e.g., remote sensor beams illuminated by a transmission beam of sensor element 264 and therefore within illumination zone 570) and/or 572 (e.g., remote sensor beams outside illumination zone 570) may be continually adjusted to place remote sensor beams 564 and/or 572 at substantially fixed, absolute positions. At any given time, remote sensor returns corresponding to a set of fixed remote sensor beams within the current illumination zone 570 (e.g., remote sensor beams 564) is acquired and then processed, as described herein. Also as described herein, in a digital beamforming-on-receive remote sensing system, the illumination zone may correspond to the span of a transmit beam of sensor element 264 and can encompass all receive beams (e.g., remote sensor beams 564, 572) periodically as sensor element 264 is scanned through an area of interest. In various embodiments, the angular width of the transmission beam may be from approximately 60 degrees to 120 degrees, and may also extend as wide as 180 degrees or as short as 40 degrees.

Figure 6:
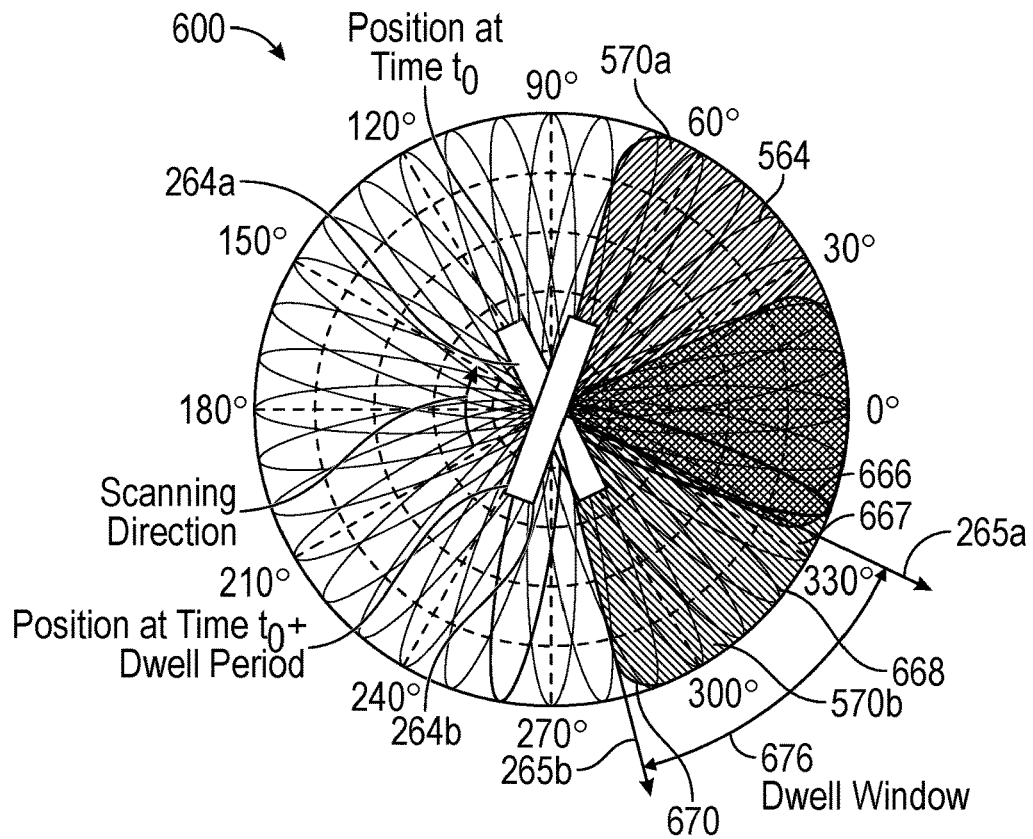
FIG. 6 illustrates a diagram of a remote sensing system operating in accordance with an embodiment of the disclosure.

FIG. 6 illustrates a diagram of a remote sensing system 600 operating in accordance with an embodiment of the disclosure, and, in particular, illustrates relatively fast scanning with continuous sequential beam processing in accordance with an embodiment of the disclosure. For example, in some embodiments, the scan speed may be increased so that dwell window 676 (e.g., the scan angle covered during a single dwell period) spans multiple remote sensor beams 564 rather than just a single beam. As shown in the embodiment presented in FIG. 6, sensor element orientation 264a forms illumination zone 570a at time to, and sensor element orientation 264b forms illumination zone 570b at time to plus the corresponding dwell period, where angle 265a indicates a leading edge of illumination zone 570a and angle 265b indicates a leading edge of illumination zone 570b. In the embodiment shown in FIG. 6, dwell window 676 is the scan angle scanned by the leading edge of the illumination zone generated by the antenna (e.g., scanning sensor array 264 of FIG. 2) over the dwell period for the system, and dwell window 676 spans five fixed remote sensor beams 564.

If all remote sensor beams 564 are computed simultaneously, beams at the edges of the illumination zones will not be completely covered during an entire dwell period and can result in partial and/or inaccurate remote sensor data and/or imagery. One solution is to perform continuous sequential beam processing (e.g., sliding-window processing) on the remote sensor beams 564 as they enter the scanning illumination zone (e.g., illustrated by illumination zones 570a and 570b). For example, as the current illumination zone scans (e.g., clockwise from illumination zone 570a to illumination zone 570b), remote sensor returns from each beam may be acquired as soon as that beam enters the illumination zone (e.g., when the illumination zone scans over the fixed remote sensor beam). When data acquisition for a remote sensor beam is complete (e.g., periodically, substantially within or at a time corresponding to a dwell period), the corresponding remote sensor return can be processed. In various embodiments, such processing may include Doppler processing, such as applying a fast Fourier transform (FFT) computed across one or more acquired returns (e.g., completed acquisitions) in a dwell period. In other embodiments, such processing may include any processing configured to extract signal characteristics from the remote sensor returns (e.g., corresponding to range, relative velocity, Doppler shift, and/or other target characteristics detectable by a ranging sensor system, such as a radar system).

For example, as shown in FIG. 6, the dwell period (and acquisition) of remote sensor beam 666 (e.g., a leading remote sensor beam for illumination zone 570a at time t0) has just begun. The acquisition of remote sensor returns corresponding to remote sensor beam 666 will continue for a full dwell period, during which time a leading edge of the illumination zone for the antenna will have moved/scanned through an angle, shown in FIG. 6 as dwell window 676 between leading edge 265a of illumination zone 570a and leading edge 265b of illumination zone 570b. During that time, other beams (e.g. 667 and 668) will sequentially enter the scanning illumination zone and acquisition of corresponding remote sensor returns will begin. At time t0+dwell period, a dwell/acquisition period for beam 666 is complete and the remote sensor returns for that beam can be processed (e.g. Doppler processing, target detection, imaging, etc.) to provide remote sensor data and/or imagery, as described further herein. At the same time, the dwell/acquisition period for beam 670 has just begun.

In one or more embodiments, as dwell/acquisition for each remote sensor beam 564 completes, the corresponding remote sensor returns may be processed in groups of acquired remote sensor returns corresponding to the width of dwell window 676, for example, or in groups corresponding to multiple dwell windows, and/or in subsets of such groups (e.g., in groups corresponding to two or more remote sensor beams 564).

In order to maximize scan speed without loss of detection performance (e.g., without substantially decreasing time-on-target), embodiments of the present disclosure may be configured to maximize the scan speed such that the illumination time of a given target matches the dwell period for the operational mode of the remote sensing assembly (e.g., the width of the illumination zone substantially matches the width of the corresponding dwell window). As an example, FIG. 7 illustrates a diagram of a remote sensing system 700 operating in accordance with an embodiment of the disclosure, and, in particular, illustrates matching scan speed of the system to the dwell period of the system in accordance with an embodiment of the disclosure.

Figure 7:
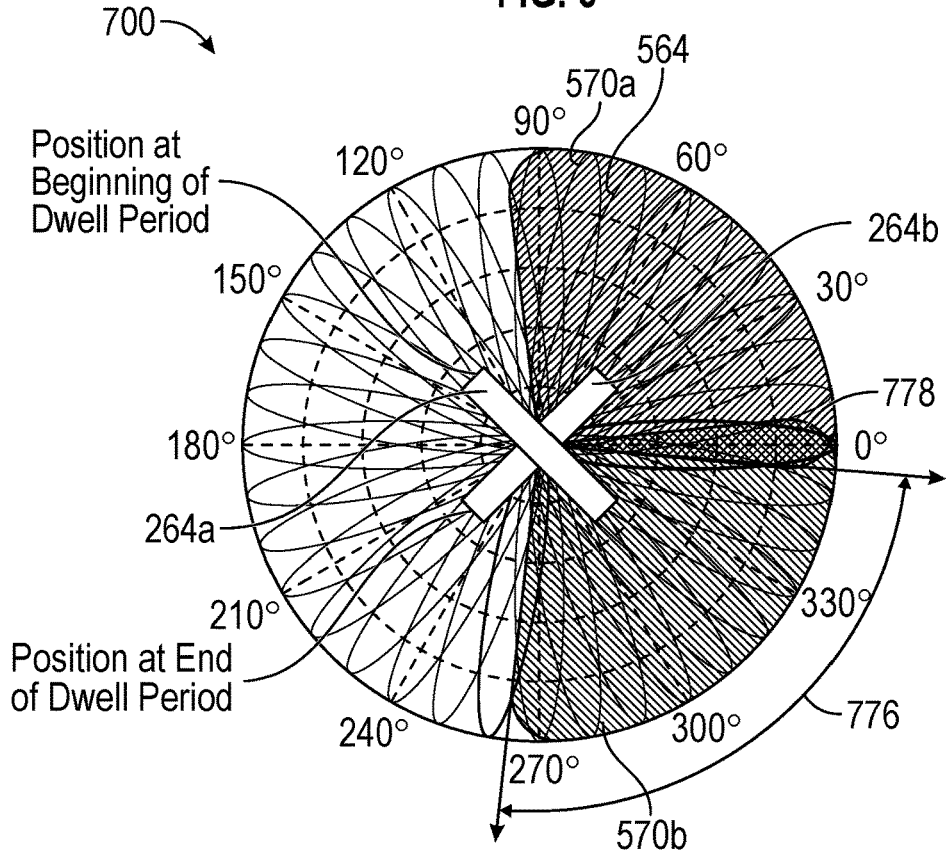
FIG. 7 illustrates a diagram of a remote sensing system operating in accordance with an embodiment of the disclosure.

As shown in FIG. 7, dwell window 776 spans substantially the width of an illumination zone (e.g., illumination zone 570a or 570b). For each remote sensor beam 564, remote sensor returns start being acquired upon entering the current illumination zone and stop when exiting the current illumination zone, where the width of the illumination zone corresponds substantially to one dwell period. For example, remote sensor beam 778 was within the current illumination zone across the entire scan from orientation 264a to orientation 264b, and a corresponding sensor return has been acquired and is ready for processing. In particular, with an illumination zone width of 90 degrees and a dwell period of 0.5 seconds, the scan speed can be increased up to 180 degrees/second without loss in detection performance. Slower scan speeds can also be used (e.g., as shown in FIG. 6); the scan speed is not required to match the dwell period exactly. To obtain the highest update rate, however, and avoid partially-illuminated beams (e.g., which can decrease accuracy and/or increase processing complexity), the scan speed should be chosen so that dwell window 776 fits an integer number of times in the current illumination zone (e.g., illumination zone 570a or 570b), where the highest update rate, without losing detection performance, would be provided where the dwell window width is substantially equal to the illumination zone width.

Embodiments of the present disclosure may therefore include a phased-array radar that rotates or scans rapidly across an azimuth axis while preserving long time-on-target. Such radar systems may be configured to perform digital beamforming (e.g., on receive) where the corresponding remote sensor receive beams have positions that are fixed relative to the Earth. In various embodiments, the system may take into account the radar system's electromagnetic center and the center of rotation when computing absolute coordinate frame referenced remote sensor beams, and such computing may take place substantially in real time. Moreover, the electromagnetic effect of the rotation/scanning of the sensor array on each individual transmit and receive sensor element (e.g., such as signal phase or temporal shift) may be compensated or accounted for by hardware or software configured to adjust the digital beamforming to compensate for the electromagnetic effect of the rotation/scanning of the sensor array, and such compensation/computing may take place substantially in real time. In some embodiments, such compensation may be implemented as individualized phase shifts or signal delays applied to each sensor element of a scanning sensor array, where the phase shifts/signal delays are configured to compensate for the instantaneous positions and/or changes in position due to rotational or translational motions of the sensor elements relative to each other, relative to a rotation or scanning axis of the scanning sensor array, and/or other reference positions, when performing digital beamforming to form sensor receive beams, as described herein.

In some embodiments, a digital beamforming-on-receive radar system may be configured to scan rapidly (e.g., >30 degrees/s rotation) in the azimuth plane, where the corresponding dwell window spans multiple beams substantially without loss of performance. In some embodiments, a radar system may be configured to scan at the maximum speed in the azimuth plane such that there is no loss of detection performance (e.g., a target is illuminated by the same fixed remote sensor beam during a complete dwell period) and a width of the dwell window substantially matches a width of the illumination zone. In various embodiments, a radar system may be configured to continuously sequentially process remote sensor returns as their corresponding dwell periods are completed. In some embodiments, a radar system may be configured to maximize the following ratio: time-on-target divided by time required to cover 360°, with a single antenna comprising an array of sensor elements (e.g., a scanning sensor array).

Figure 8:
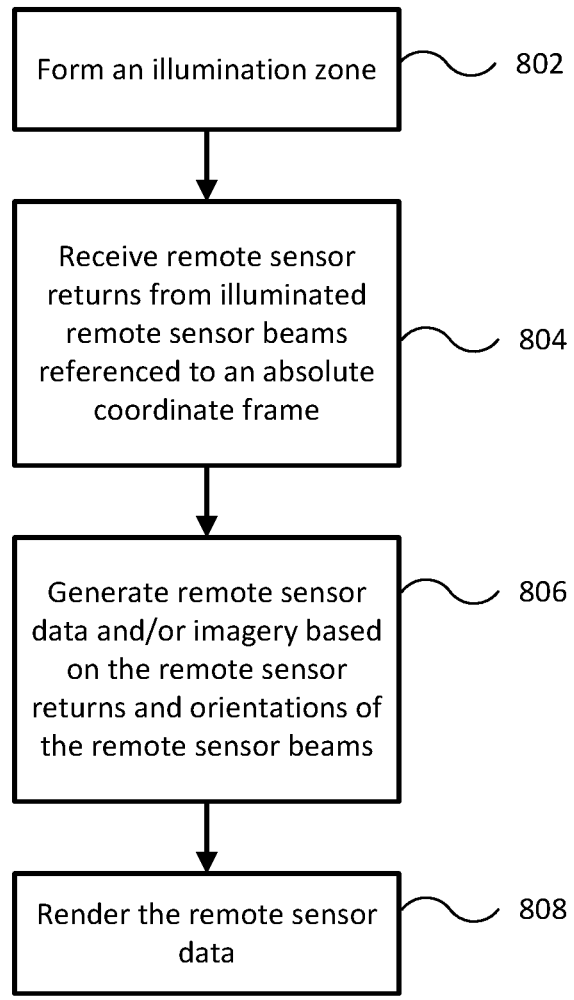
FIG. 8 illustrates a flow diagram of various operations to operate a remote sensing system in accordance with an embodiment of the disclosure.

FIG. 8 illustrates a flow diagram of process 800 to provide remote sensing data and/or imagery using ranging sensor system 101 in accordance with embodiments of the disclosure. In some embodiments, the operations of FIG. 8 may be implemented as software instructions executed by one or more logic devices associated with corresponding electronic devices, sensors, and/or structures depicted in FIGS. 1 through 3. More generally, the operations of FIG. 8 may be implemented with any combination of software instructions and/or electronic hardware (e.g., inductors, capacitors, amplifiers, actuators, or other analog and/or digital components).

It should be appreciated that any step, sub-step, sub-process, or block of process 800 may be performed in an order or arrangement different from the embodiments illustrated by FIG. 8. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 800 is described with reference to systems described in FIGS. 1-3, process 800 may be performed by other systems different from those systems and including a different selection of electronic devices, sensors, assemblies, mobile structures, and/or mobile structure attributes.

Process 800 represents a method for providing remote sensing data and/or imagery using systems 100, 200, and/or 300 in accordance with embodiments of the disclosure. At the initiation of process 800, various system parameters may be populated by prior execution of a process similar to process 800, for example, or may be initialized to zero and/or one or more values corresponding to typical, stored, and/or learned values derived from past operation of process 800, as described herein.

In block 802, a logic device forms an illumination zone. For example, controller 220 of system 200 may be configured to transmit sonar beams, radar beams, and/or other transmission beams from surface 212 using transceiver 234 and sensor element 264. In some embodiments, controller 220 may be configured to receive sensor transmission orientation and/or position data from OPS 190 corresponding to the transmitted beams, for example, for further processing. In other embodiments, controller 220 may be configured to receive a desired orientation, position, and/or angular frequency (e.g., an absolute angular frequency) for motion of sensor element 264, as user input from user interface 120 for example, and be configured to control a corresponding actuator (e.g., actuator 316) to adjust the orientation and/or position of sensor element 264 prior to forming the illumination zone/transmission beam. In various embodiments, controller 320 may be configured to receive adjusted sensor transmission orientation and/or position data from OPS 190 prior to proceeding to block 804.

In block 804, a logic device receives remote sensor returns from illuminated remote sensor beams referenced to an absolute coordinate frame. For example, controller 220 may be configured to receive remote sensor returns from sensor element 264 and/or transceiver 234 (e.g., remote sensing assembly 210) corresponding to remote sensor beams within the illumination zone formed in block 802. In some embodiments, controller 220 may be configured to receive remote sensor return orientation and/or position data from OPS 190 at substantially the same time. In various embodiments, the remote sensor beams may be referenced to an absolute coordinate frame, such as Magnetic or True North.

In some embodiments, forming a remote sensor beam may involve receiving signals at multiple different sensor elements in a sensor array and performing hardware and/or software implemented beamforming on the signals (e.g., performing digital and/or analog beamforming-on-receive processing) to form the remote sensor beam and/or receive remote sensor returns corresponding to the remote sensor beam. Such beamforming may be based, at least in part, on a measured orientation and/or position of the scanning sensor array and the substantially static orientations. In some embodiments, forming a remote sensor beam may involve any hardware or software implemented process that can be used to focus, direct, and/or acquire remote sensor returns at a selected and/or specific orientation relative to an orientation of a sensor array and/or relative to any other reference frame, including any absolute reference frame (e.g., North referenced, Earth referenced, and/or other absolute reference frames). In other embodiments, forming a remote sensor beam may involve any hardware or software implemented process that can be used to receive remote sensor returns from a particular spatial position, directly or indirectly.

In some embodiments, controller 220 may be configured to receive a desired orientation, position, and/or angular frequency from user interface 120 and be configured to control a corresponding actuator (e.g., actuator 316) to adjust the orientation and/or position of sensor element 264 prior to or while receiving the remote sensor returns, then receiving, with the remote sensor returns, adjusted sensor return orientation and/or position data from OPS 190. In other embodiments, controller 220 may be configured to receive the substantially static orientations as user input from a user interface. In embodiments where remote sensor assembly 210 comprises a sonar assembly and sensor element 264 comprises a sonar transducer, the actuator may be configured to adjust an orientation and/or position of the sonar transducer and/or OPS 190 (e.g., if OPS is fixed relative to the sonar transducer) while the remote sensor returns are received by controller 220.

In embodiments where remote sensor assembly 210 comprises a radar assembly (e.g., radar assembly 310), actuator 316 may be configured to rotate radar antenna 364 and/or OPS 190 about axis 313 of radar assembly 310 while the remote sensor returns are received by controller 320. In one such embodiment, controller 320 may be configured to control actuator 316 to rotate radar antenna 364 and/or OPS 190 according to the desired angular frequency relative to an absolute coordinate frame using absolute sensor return orientation and/or position data provided, at least in part, by OPS 190 (e.g., such as when OPS 190 includes a magnetometer capable of measuring Magnetic North and/or a GNSS compass). In various embodiments, OPS 190 may include one or more of accelerometer/gyroscope 144, GPS 146, and/or orientation sensor 140 (e.g., a magnetometer, a float level, a compass, an encoder, and/or other orientation sensing device adapted to measure the orientation and/or position of sensor element 264 during motion of sensor element 264, remote sensor assembly 210, and/or ranging sensor system 101.

In block 806, a logic device generates remote sensor data and/or imagery based on the remote sensor returns and orientations of the remote sensor beams. For example, controller 220 may be configured to generate remote sensor data based, at least in part, on the remote sensor returns and sensor return orientation and/or position data determined and/or received from sensor element 264, transceiver 234, and OPS 190 in block 804. In embodiments where controller 220 is configured to control an actuator (e.g., actuator 316) to adjust the orientation and/or position of sensor element 264 (e.g., in blocks 802 and/or 804) prior to or during transmission of remote sensor beams and/or remote sensor returns, controller 220 may also be configured to generate the remote sensor data based, at least in part, on the remote sensor returns and the adjusted sensor return orientation and/or position data received in block 804.

In block 808, a logic device renders the remote sensor data. For example, controller 220 may be configured to render the remote sensor data generated in block 806 using a display of user interface 120. In some embodiments, the rendered remote sensor data (e.g., target detection data, image data, and/or other remote sensor data) may be referenced to an absolute coordinate frame (e.g., North-up) and/or a coordinate frame of the mobile structure (e.g., course-up).

In such embodiments, controller 220 may be configured to determine the absolute coordinate frame display reference and/or the coordinate frame of the mobile structure display reference (e.g., both of which can require determination of the offset angle) based, at least in part, on the sensing element angle measurements and/or GPS data provided by OPS 190. For example, in some embodiments, a time series of GPS data may be used to measure SOG, COG, and/or track for ranging sensor system 101, thereby providing an estimate of the orientation of ranging sensor system 101 relative to an absolute coordinate frame (e.g., using the GPS as a GNSS compass and assuming the track substantially coincides with a longitudinal axis of ranging sensor system 101).

In further embodiments, position data, orientation data, and/or remote sensor data and/or imagery acquired and/or processed in blocks 802-808 may be used to control operation of ranging sensor system 101, such as by controlling platform actuator 316 to scan sensing assembly 310 according to a desired angle, angular frequency, area of interest, one or more waypoints, and/or other types of user and/or environmental input.

It is contemplated that any one or combination of methods to provide remote sensor data and/or imagery may be performed according to one or more operating contexts of a control loop, for example, such as a startup, learning, running, and/or other type operating context. For example, process 800 may proceed back to block 802 and proceed through process 800 again to produce updated augmented reality sonar imagery, as in a control loop.

Embodiments of the present disclosure can thus provide accurate and reliable remote sensor data and/or imagery. Such embodiments may be used to provide sonar, radar, and/or other remote sensor data and/or imagery to assist in surveillance of an area of interest, in navigation for a mobile structure, survey of a body of water, and/or to assist in the operation of other systems, devices, and/or sensors coupled to a surveillance system.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:
a remote sensing assembly comprising a scanning sensor array;
a logic device configured to communicate with the remote sensing assembly, wherein the logic device is configured to:
receive remote sensor returns from a plurality of remote sensor beams within an illumination zone corresponding to a span of a transmit beam of the remote sensing assembly, wherein each remote sensor beam is formed using the scanning sensor array and comprises a substantially static orientation relative to an Earth-referenced coordinate frame while the transmit beam changes orientation relative to the Earth-referenced coordinate frame to scan through an area of interest; and
generate remote sensor data based, at least in part, on the remote sensor returns and the substantially static orientations of the plurality of remote sensor beams.

2. The system of claim 1, wherein:
each remote sensor beam enters and then exits the illumination zone as the transmit beam changes orientation; and
a dwell window width of the remote sensing assembly is equal to or greater than a width of two of the remote sensor beams.

3. The system of claim 1, wherein:
a width of the illumination zone is substantially equal to a dwell window width of the remote sensing assembly.

4. The system of claim 1, wherein each remote sensor beam is configured to focus, direct, and/or acquire remote sensor returns at a given orientation relative to a sensor array orientation and/or another reference frame, and wherein the receiving the remote sensor returns comprises:
  determining that one or more of the plurality of remote sensor beams has entered the illumination zone; and
  acquiring corresponding one or more remote sensor returns from the detected one or more remote sensor beams for a dwell period of the remote sensing assembly.

5. The system of claim 1, wherein the generating the remote sensor data comprises:
  determining that one or more of the remote sensor returns has been acquired for a dwell period of the remote sensing assembly; and
  processing the one or more of the remote sensor returns to extract signal characteristics from the one or more of the remote sensor returns.

6. The system of claim 1, further comprising:
  an actuator configured to adjust an orientation and/or position of the scanning sensor array to scan the scanning sensor array; and
  an orientation and/or position sensor (OPS) configured to measure the orientation and/or position of the scanning sensor array, wherein the logic device is configured to:
  control the actuator to scan additional illumination zones with the scanning sensor array;
  receive additional remote sensor returns corresponding to the remote sensor beams within each additional illumination zone; and
  generate the remote sensor data based, at least in part, on the additional remote sensor returns and/or corresponding measured orientations and/or positions of the scanning sensor array.

7. The system of claim 6, wherein:
  each remote sensor beam is formed by performing digital beamforming-on-receive processing on signals received by the scanning sensor array based, at least in part, on the measured orientations and/or positions of the scanning sensor array.

8. The system of claim 6, wherein:
  the OPS comprises one or more of an accelerometer, a sensing element angle sensor, a gyroscope, a GPS, a magnetometer, an encoder, a float level, and/or a compass adapted to measure the orientation and/or position of the scanning sensor array during motion of the scanning sensor array and/or the remote sensing assembly;
  the remote sensing assembly comprises a radar assembly;
  the scanning sensor array comprises a radar antenna; and
  the actuator is configured to rotate the radar antenna and/or the OPS about an axis of the radar assembly while the remote sensor returns are received by the logic device.

9. The system of claim 6, wherein:
  the logic device is configured to control the actuator to rotate the radar antenna and/or the OPS according to a desired angular frequency relative to the Earth-referenced coordinate frame using absolute sensor return orientation and/or position data provided, at least in part, by the OPS.

10. The system of claim 1, further comprising a display in communication with the logic device, wherein the logic device is configured to:
  render the remote sensor data using the display.

11. A system comprising:
  a remote sensing assembly comprising a scanning sensor array;
  an orientation and/or position sensor (OPS) configured to measure an orientation and/or position of the scanning sensor array; and
  a logic device configured to communicate with the remote sensing assembly, wherein the logic device is configured to:
  receive remote sensor returns from a plurality of remote sensor beams within an illumination zone of the remote sensing assembly, wherein each remote sensor beam is formed using the scanning sensor array and comprises a substantially static orientation relative to an Earth-referenced coordinate frame, wherein the substantially static orientations are received as user input from a user interface, and one or more of the plurality of remote sensor beams are formed by performing digital beamforming-on-receive processing on the received remote sensor returns based, at least in part, on a measured orientation and/or position of the scanning sensor array and the substantially static orientations of the remote sensor beams; and
  generate remote sensor data based, at least in part, on the remote sensor returns and the substantially static orientations of the plurality of remote sensor beams.

12. The system of claim 11, wherein the performing the digital beamforming-on-receive processing comprises:
  compensating for motion of the scanning sensor array and/or for electromagnetic effects caused by motion of the scanning sensor array when forming the one or more of the plurality of remote sensor beams.

13. A method comprising:
  receiving remote sensor returns from a plurality of remote sensor beams within an illumination zone corresponding to a span of a transmit beam of a remote sensing assembly, wherein each remote sensor beam is formed using a scanning sensor array and comprises a substantially static orientation relative to an Earth-referenced coordinate frame while the transmit beam changes orientation relative to the Earth-referenced coordinate frame to scan through an area of interest; and
  generating remote sensor data based, at least in part, on the remote sensor returns and the substantially static orientations of the plurality of remote sensor beams;
  wherein a dwell window width of the remote sensing assembly is equal to or greater than a width of two of the remote sensor beams.

14. The method of claim 13, wherein:
  each remote sensor beam enters and then exits the illumination zone as the transmit beam changes orientation;
  a width of the illumination zone is substantially equal to a dwell window width of the remote sensing assembly.

15. The method of claim 13, wherein each remote sensor beam is configured to focus, direct, and/or acquire remote sensor returns at a given orientation relative to a sensor array orientation and/or another reference frame, and wherein the receiving the remote sensor returns comprises:
  determining that one or more of the plurality of remote sensor beams has entered the illumination zone; and
  acquiring corresponding one or more remote sensor returns from the detected one or more remote sensor beams for a dwell period of the remote sensing assembly.

16. The method of claim 13, wherein the generating the remote sensor data comprises:

determining that one or more of the remote sensor returns has been acquired for a dwell period of the remote sensing assembly; and processing the one or more of the remote sensor returns to extract signal characteristics from the one or more of the remote sensor returns.

17. The method of claim 13, further comprising:

receiving the substantially static orientations as user input from a user interface; and forming one or more of the plurality of remote sensor beams by performing digital beamforming-on-receive processing on the received remote sensor returns based, at least in part, on a measured orientation and/or position of the scanning sensor array and the substantially static orientations.

18. The method of claim 17, wherein the performing the digital beamforming-on-receive processing comprises:

compensating for motion of the scanning sensor array and/or for electromagnetic effects caused by motion of the scanning sensor array when forming the one or more of the plurality of remote sensor beams.

19. The method of claim 13, further comprising:

controlling an actuator to scan additional illumination zones with the scanning sensor array;

receiving additional remote sensor returns corresponding to the remote sensor beams within each additional illumination zone; and generating the remote sensor data based, at least in part, on the additional remote sensor returns and/or corresponding measured orientations and/or positions of the scanning sensor array provided by an orientation and/or position sensor (OPS).

20. The method of claim 19, further comprising:

rendering the remote sensor data using a display, wherein:

the OPS comprises one or more of an accelerometer, a sensing element angle sensor, a gyroscope, a GPS, a magnetometer, an encoder, a float level, and/or a compass adapted to measure the orientation and/or position of the scanning sensor array during motion of the scanning sensor array and/or the remote sensing assembly;

the remote sensing assembly comprises a radar assembly;

the scanning sensor array comprises a radar antenna; and the actuator is configured to rotate the radar antenna and/or the OPS about an axis of the radar assembly while the remote sensor returns are received; and controlling the actuator to rotate the radar antenna and/or the OPS according to a desired angular frequency relative to the Earth-referenced absolute coordinate frame using absolute sensor return orientation and/or position data provided, at least in part, by the OPS.

* * * * *